United States Patent [19]

Gross

[11] 4,105,287
[45] Aug. 8, 1978

[54] OPTICAL READING SYSTEM FOR ELECTRONIC POCKET CALCULATORS

[76] Inventor: Lothar Gross, 10 Akazienweg, 7012 Fellbach, Fed. Rep. of Germany

[21] Appl. No.: 708,334

[22] Filed: Jul. 26, 1976

[30] Foreign Application Priority Data

Jul. 30, 1975 [DE] Fed. Rep. of Germany ....... 2533941
Feb. 27, 1976 [DE] Fed. Rep. of Germany ....... 2607972
Apr. 15, 1976 [DE] Fed. Rep. of Germany ....... 2616896

[51] Int. Cl.² .......................................... G02B 17/06
[52] U.S. Cl. ................. 350/113; D64/11 B; 40/447; 350/115
[58] Field of Search ................ 350/113, 112, 160 LC, 350/114, 115, 185, 190, 199, 282, 276 R, 165, 175 NG, 293, 294, 244, 202, 203, 67; 235/1 D; 40/114 K; D64/40, 11 C, 11 B

[56] References Cited

U.S. PATENT DOCUMENTS

| | | | |
|---|---|---|---|
| 1,590,011 | 6/1926 | Donahue | 350/113 |
| 1,699,689 | 1/1929 | Curry | 350/296 |
| 2,376,710 | 5/1945 | Maurer | 350/67 |
| 2,629,003 | 2/1953 | Haalck | 350/113 |
| 2,959,087 | 11/1960 | Strickland, Jr. | 350/113 |
| 2,977,082 | 3/1961 | Harris | 350/113 |
| 3,330,681 | 7/1967 | Scharf et al. | 350/165 |
| 3,537,776 | 11/1970 | Connito | 350/296 |
| 3,786,626 | 1/1974 | Hurt | 350/112 |
| 3,887,791 | 6/1975 | Kitchens | 235/1 D |

*Primary Examiner*—John K. Corbin
*Assistant Examiner*—B. W. de los Reyes
*Attorney, Agent, or Firm*—William Anthony Drucker

[57] ABSTRACT

The optical reading system is provided for displaying the luminous digits of the display of an electronic pocket calculator. The calculator is held within a housing which carries an optical reversing system above the digital display whereby a non-reversed image of the digits can be viewed in a substantially vertical plane. The reversing system is preferably formed by a cylindrical lens and a mirror.

9 Claims, 10 Drawing Figures

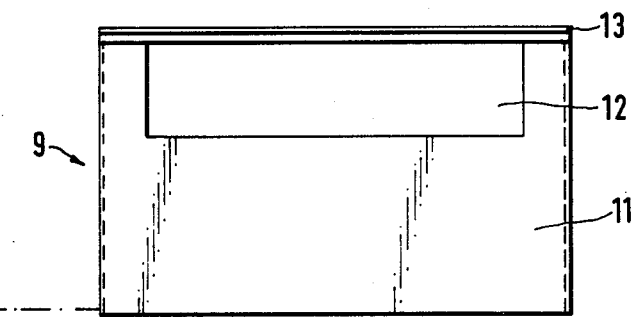
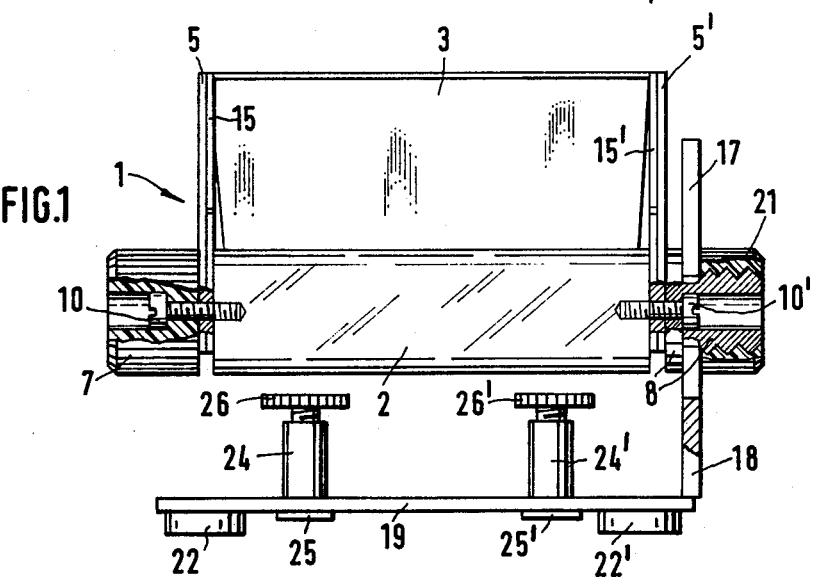

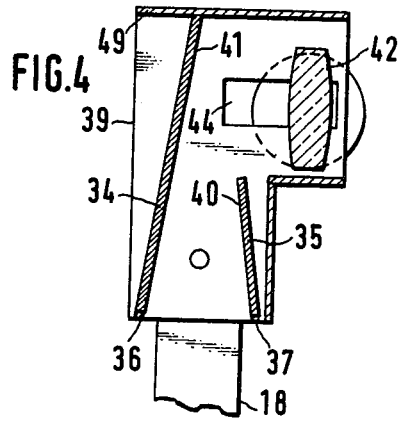
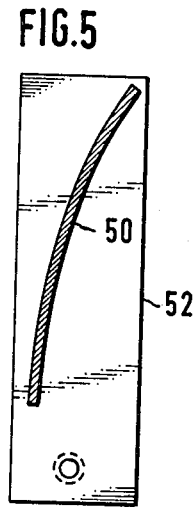
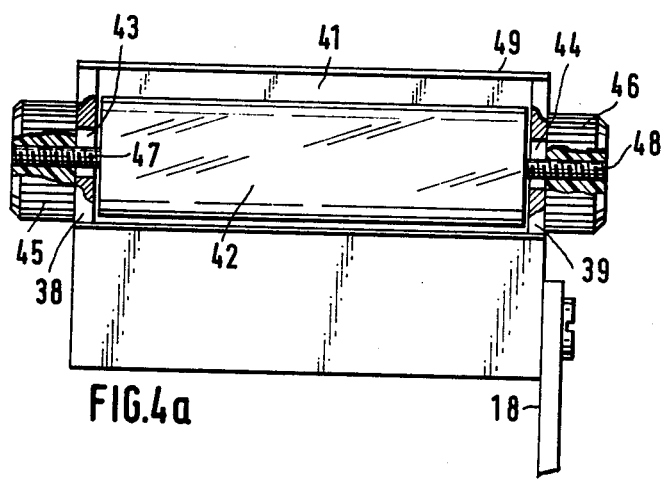
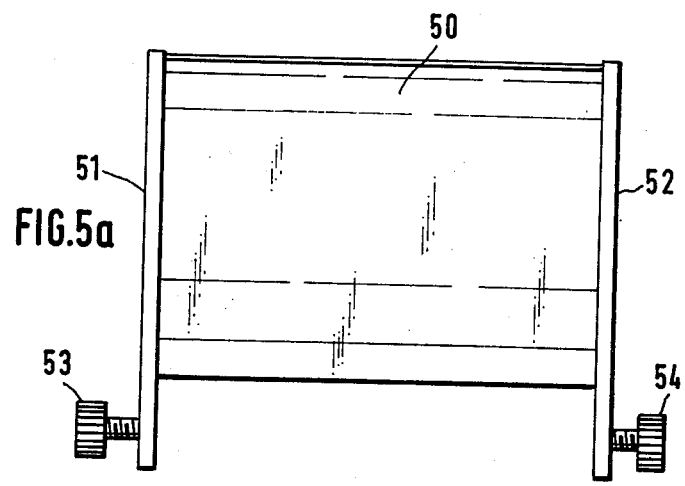

OPTICAL READING SYSTEM FOR ELECTRONIC POCKET CALCULATORS

BACKGROUND TO THE INVENTION

The invention relates to an optical reading system for electronic pocket calculators.

In the known electronic pocket calculators, the small luminous digits of the display usually lying in one plane with the keyboard are disadvantageous. The reading range is thus greatly limited, so that for calculation the pocket calculator must be set up on or beside the writing documents. To read the digits one must bend over the calculator display or take the calculator in hand, in the case of lengthy work with the calculator at the desk this is very disadvantageous.

OBJECT OF THE INVENTION

According to the invention we provide an optical reading system in which over the digital display of electronic pocket calculators an optical reversing system is arranged which deflects the digits of the calculator display as an upright image (non-reversed) into an approximately vertical plane.

The reversing system may consist of a cylinder of optical synthetic plastics material or glass, parallel with the longitudinal axis of which a mirror is arranged at an inclined angle. In order to screen off the cylinder against light incidence and to prevent troublesome reflection, the cylinder can be covered appropriately by non-transparent and/or reflection-reducing fittings. Such a reversing system formed from cylinder and mirror can be produced simply and cheaply. The cylinder enlarges and reverses the digits which are reproduced upright and optimally legibly in the mirror inclined in relation to the cylinder.

In another example of embodiment of the invention the digits are deflected by an appropriately ground pentahedral prism into an upright image. The digit enlargement takes place preferably by a lens system of rod form which is adjustably arranged in front of the prism.

According to a further feature of the invention the reversing system is formed from two surface mirrors the mirror faces of which stand opposite to one another with spacing, the rear mirror protruding downwards or upwards beyond the forward mirror and at least one mirror being arranged at an inclination in relation to the other mirror. To enlarge the digits a lens system of rod form is arranged according to the invention in front of the mirror surface of the rear mirror protruding beyond the other mirror, and is horizontally and also vertically adjustable.

In order to produce an especially simple and cheap reversing system, according to a further feature of the invention a concave mirror standing at an inclination to the digital display of the pocket calculator is used.

According to the invention the optical components are combined into one construction unit by the arrangement of side parts or the like.

In order to screen off the digital display still better against light incidence, according to a further feature of the invention the construction unit is provided with a screen comprising a front plate and a roof part, an aperture being arranged in the front plate so that the displayed digits are clearly legible. The roof part preferably forwardly protrudes beyond the front plate and thus also screens the aperture against interfering light incidence from above.

According to a further feature of the invention the front plate of the screen possesses a downwardly displaceable cover part which according to the setting of the construction unit adapts itself to the calculator cover plate and thus covers the luminous digits of the calculator display or their glare from the viewer.

For the securing of the construction unit on the calculator housing according to one example of embodiment of the invention the side parts are prolonged so that they protrude downwards beyond the construction unit, preferably the side parts possess securing elements which render it possible to hold the optical reading system fast in the desired position on the calculator housing.

Such an optical reading system can be used in each case for pocket calculators with the same form and dimensions.

In order to make the optical reading system universal, so that it can be used for the most various models of pocket calculators, according to one feature of the invention the construction unit is adjustably and securably attached to a carrier which is connected with a support plate or the like.

In order that the construction unit may be adjusted still better, according to another feature of the invention the carrier is provided with a longitudinal slot in which the guide screw with knurled nut connected with the construction unit is displaceably mounted. For the adjustment of the size of the digits the construction unit is vertically adjustable in relation to the calculator and for the setting of the correct position in relation to the angle of view of the observer it is rotatable. The securing of the construction unit in the desired position is effected by the knurled nut situated on the guide screw.

According to a further feature of the invention on the support plate for the calculator at least one stop is fixedly arranged which serves for the simple and rapid positioning of the calculator on the support plate.

According to another feature of the invention stops are provided which are longitudinally and transversely displaceable and securable in grooves of the support plate. At least one stop is preferably formed as a retaining clamp which prevents the calculator from lifting away from the support plate.

An embodiment of the adjustable optical reading system according to the invention of the described kind renders possible problem-free and rapid positioning of the calculator, especially because the adjustment of the stops for the specific calculator has to be effected only once, the securing is preferably effected by a stop formed as clamp which can be secured by magnetic force on the support plate made from sheet steel.

The securing of the calculator takes place, according to another proposal in accordance with the invention, by a permanent magnetic plate secured with the support face of the calculator housing.

The embodiments of the optical reading system described according to the invention can be produced simply and cheaply, any desired pocket calculator models can be used especially advantageously for calculation at the desk, since the reading range is substantially extended by the optical reading system. The working space remains free for writing and drawing, since the pocket calculator together with the optical reading system can be set up behind the writing documents, the enlarged digits can be read better, without the necessity of bending over the calculator display.

BRIEF DESCRIPTION OF DRAWINGS

Various examples of embodiment of the invention are represented in the drawings, wherein:

FIG. 1 shows an optical reading system in front view, for better clarity the sliding part and the screen are removed, the sectional parts are represented broken away, FIG. 1a shows the sliding part of the optical reading system in front view, FIG. 1b shows the screen of the optical reading system in front view, FIG. 4 shows a construction unit of the optical reading system where the reversing system is formed from two mirrors, in longitudinal section, as an alternative form of embodiment of the invention, FIG. 4a shows the associated front view, FIG. 5 shows a construction unit of the optical reading system with a concave mirror as reversing system, in a longitudinal section, as a further form of embodiment of the invention, FIG. 5a shows the associated front view.

DESCRIPTION OF PREFERRED EMBODIMENTS

Figure 2:
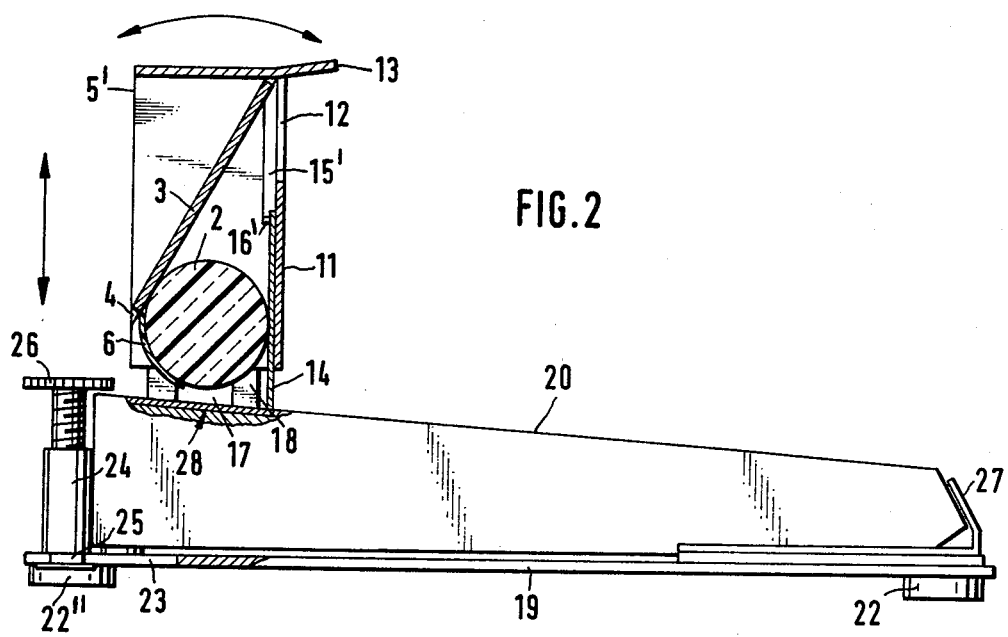
FIG. 2 shows a lateral elevation of the optical reading system with inserted calculator, the construction unit is shown in longitudinal section for better clarity, section parts are in part shown broken away.

The optical reading system, as represented in FIGS. 1 and 2, consists of the optical reversal system 1 which is formed from the cylinder 2, produced for example from optical synthetic plastics material, and the surface mirror 3. The surface mirror 3 is secured parallel with the longitudinal axis of the cylinder 2 at an oblique angle in grooves 4 of the side parts 5, 5'. The surface of the cylinder 2 is appropriately covered from troublesome light incidence by a non-transparent fitting 6. The assembling and securing of the side parts 5, 5', the mirror 3, the knob 7, the guide screw 8 and the screen 9 with the cylinder 2 as construction unit is effected by means of the screws 10, 10' which are screwed to internal threadings situated in the ends of the cylinder 2. The screen 9 consists of the front plate 11 having an aperture 12 which is upwardly defined by the roof part 13 which protrudes forwards over the front plate 11. The displaceable cover part 14 is guided in longitudinal grooves 15, 15' of the side parts 5, 5', the longitudinal grooves 15, 15' being upwardly widened to receive the stops 16, 16' of the cover part 14, which prevent the sliding part from falling out. The construction unit is mounted for vertical displacement and rotation by means of the guide screw 8 in the longitudinal slot 17 of the vertical carrier 18 which is firmly connected with the support plate 19 for the calculator 20, for example by hard soldering. The knurled nut 21, which is screwed to the external threading of the guide screw 8, here serves for the guidance and securing of the guide screw 8 connected with the construction unit. So that the support plate 19 may stand securely without slipping, rubber feet 22, 22', 22" are fitted on its lower face. Longitudinal grooves 23 are worked into the support plate 19, in which grooves the stops 24, 24' for the calculator 20 are guided longitudinally displaceably and securably by groove blocks 25, 25'. The stops 24, 24' possess vertically adjustable discs 26, 26' at the top which grasp over the upper edge of the calculator housing and thus prevent the calculator 20 from lifting away from the support plate 19. For the rapid and simple securing of the calculator 20 a magnetic stop 27 is removably arranged on the support plate 19 made from sheet steel, the cross bar of which stop is formed as clamp. For the sake of completeness it should be mentioned that the securing of the calculator 20 on the support plate 19 can also be effected by a permanent magnet plate of synthetic plastics material firmly connected with the support surface of the calculator housing.

Figure 3:
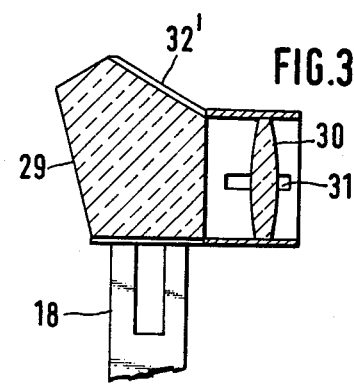
FIG. 3 shows another form of embodiment of the invention, namely a construction unit of the optical reading system with a prism as reversing system, in longitudinal section.
Figure 3A:
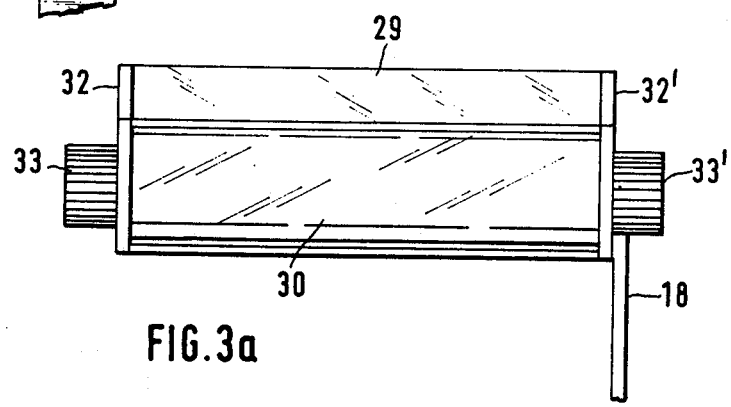
FIG. 3a shows the associated front view.

FIGS. 3 and 3a show a construction unit of the optical reading system which possesses a pentahedral prism 29 as reversing system. Before the vertical face of the prism 29 a rod lens 30 is displaceably arranged in grooves 31 of the side parts 32, 32'. The attachment, adjustment and securing of the rod lens 30 are effected by the knobs 33, 33'. The fastening above the digital display 28 of the calculator 20 takes place on the carrier 18, as represented in FIGS. 1 and 2.

FIGS. 4 and 4a show a reversing system formed from mirrors as construction unit of the optical reading system. The construction unit is secured by the carrier 18 over the digital display 28 of the calculator 20, as shown in FIGS. 1 and 2, and consists of the mirrors 34, 35 secured in grooves 36, 37 of the side parts 38, 39. The mirror surface 40 of the mirror 35 is here so inclined that the luminous digits situated in the digital display are reproduced inverted therein. The mirror surface 41 of the mirror 34 stands opposite to the mirror surface of the mirror 35, namely with such inclination that an upright reproduction of the reflected digits occurs in the part of the mirror surface 41 protruding beyond the mirror 35. For the enlargement of the digits reproduced in the mirror surface 41 by way of example a bi-convex rod lens 42 is arranged in front of the mirror surface 41, which lens is mounted horizontally and vertically displaceably and securably in the slots 43, 44 of the side parts 38, 39.

The displacement and securing of the rod lens 42 can be effected by the knobs 45, 46 which are screwably secured by threaded bolts 47, 48 firmly connected with the rod lens 42. The diameters of the threaded bolts 47, 48 are here smaller than the height of the slots 43, 44, so that a vertical displacement of the rod lens 42 is also achieved. Naturally the adjusting mechanism for the rod lens can also be of other information.

For screening against interfering light incidence the construction unit is enclosed by a housing 49 of appropriate configuration.

FIGS. 5 and 5a show an especially simple reversing system of the optical reading system. A concave mirror 50 is assembled into a construction unit by the side parts 51, 52 which protrude downwardly below the lower edge of the concave mirror. The side parts preferably possess securing elements 53, 54 in the form of screws, leaf springs or the like which render it possible for the optical reading system to be held fast in the desired position directly on the calculator housing.

I claim:

1. An electronic pocket calculator comprising a calculator housing having a digital display, and an optical reading system with means removably securing the calculator housing, in a position above the digital display, and adjustably mounted for vertical displacement, the optical reading system including first optical reversing means positioned adjacent the digital display to reverse the image of the digital display and second optical reversing means positioned adjacent the first optical reversing means to reverse the image again thereby to provide an adjustable upright image of the digital display in an approximately vertical plane thereby to provide an upright image of the digital display, wherein the first optical reversing means consists of a cylinder of optical material and the second optical reversing means consists of a mirror arranged at an inclined angle and parallel with the longitudinal axis of the cylinder.

2. An electronic pocket calculator according to claim 1, wherein the surface of said cylinder is partially covered by non-transparent material.

3. An electronic pocket calculator according to claim 1, wherein the surface of said cylinder is partially covered by a reflection reducing material.

4. An electronic pocket calculator according to claim 1, wherein the reading system is provided with a screen comprising a front plate and a roof part spaced from the front plate to define an aperture therebetween, the roof part protruding forward over the front plate.

5. An electronic pocket calculator according to claim 4, wherein the front plate of the screen possesses a downwardly displaceable cover part for covering the front plate in relation to the calculator display.

6. An electronic pocket calculator according to claim 1, further comprising a support plate for supporting the calculator body and a carrier connected with the support plate, the reading system being vertically displaceably and rotatably and securably made fast on the carrier.

7. An electronic pocket calculator according to claim 6, wherein stops for the calculator body are arranged on the support plate.

8. An electronic pocket calculator according to claim 7, wherein at least one of said stops is secured on the support plate by magnetic force.

9. An electronic pocket calculator according to claim 8, wherein a surface of the calculator housing adjacent the support plate is connected with a permanent magnet plate for securing the calculator body on the support surface.

* * * * *